(12) United States Patent
Parnin et al.

(10) Patent No.: US 9,695,709 B2
(45) Date of Patent: Jul. 4, 2017

(54) ELECTRONIC MEANS FOR DETECTING BUFFERED MAIN SHAFT SEAL WEAR OR FAILURE IN A TURBINE ENGINE

(75) Inventors: Francis Parnin, Suffield, CT (US); Armando Amador, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1326 days.

(21) Appl. No.: 13/450,533

(22) Filed: Apr. 19, 2012

(65) Prior Publication Data
US 2013/0280043 A1 Oct. 24, 2013

(51) Int. Cl.
*F01D 25/18* (2006.01)
*G01M 3/28* (2006.01)
*G01M 15/14* (2006.01)

(52) U.S. Cl.
CPC .......... *F01D 25/18* (2013.01); *G01M 3/2869* (2013.01); *G01M 15/14* (2013.01)

(58) Field of Classification Search
CPC .......... F01D 25/18; F01D 25/183; F02C 7/06; F02C 7/12; F04D 29/10; F04D 27/00; G01M 3/00; G01M 3/2869; G01M 15/14

USPC ............. 73/40, 40 R, 46, 49.2, 49.7, 114.81
See application file for complete search history.

(56) References Cited

U.S. PATENT DOCUMENTS

| 4,497,172 | A | 2/1985 | Smith | |
|---|---|---|---|---|
| 7,287,384 | B2 * | 10/2007 | Fish | F01D 25/183 415/111 |
| 2002/0197154 | A1 * | 12/2002 | Nogiwa | F04D 27/0292 415/168.2 |
| 2009/0290971 | A1 * | 11/2009 | Shamseldin | F04D 29/124 415/1 |

* cited by examiner

*Primary Examiner* — Gregory Anderson
*Assistant Examiner* — Maxime Adjagbe
(74) *Attorney, Agent, or Firm* — Cantor Colburn LLP

(57) ABSTRACT

In accordance with an embodiment, a gas turbine engine is provided having a bearing chamber leak detection system. The gas turbine engine includes a rotatable shaft, a bearing assembly supporting the rotatable shaft, and a plurality of bearing chamber seals surrounding the rotatable shaft creating an annular bearing chamber enclosing the bearing assembly. One or more walls substantially surrounding the bearing chamber create a plenum between the walls and the bearing chamber, and a pressurized air inlet to the plenum is provided. The pressurized air inlet includes an airflow sensor configured and positioned to sense a flow of pressurized air into the plenum, such that airflow at the sensor is indicative of airflow from the plenum into the bearing chamber via one or more of the plurality of bearing chamber seals.

20 Claims, 4 Drawing Sheets

ELECTRONIC MEANS FOR DETECTING BUFFERED MAIN SHAFT SEAL WEAR OR FAILURE IN A TURBINE ENGINE

TECHNICAL FIELD OF THE DISCLOSURE

The present disclosure relates to gas turbine engines and, more particularly, relates to early detection of main shaft seal wear or failure.

BACKGROUND OF THE DISCLOSURE

The main shaft in a gas turbine engine is supported by one or more sets of bearings. While these bearings must be lubricated to ensure continuous and efficient operation of the engine, it is also desirable to minimize the extent to which the bearing chamber may leak lubricant. Not only can leaked lubricant potentially contaminate nearby systems, but undetected leakage can also eventually lead to engine failure or damage. In addition to oil leakage, any leakage of high-temperature air into the bearing chamber could severely damage the bearings and compromise engine operation.

Bearing chamber pressurization is often used in gas turbine engines (including ground based generator and derivatives thereof) to improve the effectiveness of the bearing chamber seals to maintain lubricant within the chamber, and in general, bearing chamber pressurization enhances the ability of the seals to prevent oil from leaking from the bearing chamber and to prevent high-temperature air from penetrating into the bearing chamber. In particular, oil sump seals prevent leakage of lubricating oil into the main flow path of air and combustion gases through the engine. Buffer seal arrangements allow a portion of the compressed air produced by a compressor stage to be diverted into a buffer chamber or plenum within the engine. This buffered flow is then directed from the buffer chamber to locations close to sump seals to provide a pressure barrier against oil leakage. However, leakage may eventually occur nonetheless due to wear and degradation of the seals and/or due to problems in the buffer system.

While it is sometimes possible to redirect any oil leakage away from critical systems such as compressors for cabin air pressure and the like, this strategy does not avoid damage to the bearing or shaft itself should the leakage continue undetected or increase in severity. Indeed, typical lubricant leaks do not decrease in severity, and are typically detected only indirectly when they are substantial enough to cause noticeable excess oil consumption, or to cause main oil pressures exceeding high or low limits. Moreover, typical lubrication and buffer system sensitivities mean that excessive seal wear or failure in certain bearing compartment locations will not cause a significant enough change in the typically monitored engine parameters (main oil pressure, oil temperature, oil filter delta-P, oil quantity) to be detected without engine removal and partial disassembly.

As such, there is a continued need for an improved bearing seal leak detection system that can detect very slight amounts of wear and allow maintenance and repair before more significant damage occurs, without requiring frequent disassembly of the engine to visually inspect the seals. It will be appreciated that this background section was created by the inventors for the reader's convenience, and is meant to discuss problems and solutions noted by the inventors, not to discuss or explain prior art. Thus the inclusion of any problem or a solution in this section is not an indication that the problem or a solution is prior art.

SUMMARY OF THE DISCLOSURE

In accordance with one aspect of the present disclosure, a gas turbine engine is provided having a bearing chamber leak detection system. The gas turbine engine includes a rotatable shaft, a bearing assembly supporting the rotatable shaft, and a plurality of bearing chamber seals surrounding the rotatable shaft creating an annular bearing chamber enclosing the bearing assembly. One or more walls substantially surrounding the bearing chamber create a plenum between the walls and the bearing chamber, and a pressurized air inlet to the plenum is provided. The pressurized air inlet includes an airflow sensor configured and positioned to sense a flow of pressurized air into the plenum, such that airflow at the sensor is indicative of airflow from the plenum into the bearing chamber via one or more of the plurality of bearing chamber seals.

In accordance with another aspect of the present disclosure, a method is provided for detecting a leak in one or more bearing chamber seals protecting a bearing assembly within a bearing chamber in a gas turbine engine. The method includes providing a flow of pressurized air against the one or more bearing chamber seals from outside of the bearing chamber and measuring a flow of the pressurized air into the bearing chamber. A leak is determined to exist when the measured flow of pressurized air exceeds an expected flow of pressurized air.

In accordance with yet another aspect of the present disclosure, a controller is provided for detecting a bearing seal leak in a gas turbine engine having a bearing assembly within a bearing chamber bordered by a plurality of bearing chamber seals, wherein the plurality of bearing chamber seals are pressurized from outside of the bearing chamber via pressurized air. The controller is configured to execute steps including measuring a flow of pressurized air into the bearing chamber via at least one of the plurality of bearing chamber seals, providing an expected flow of pressurized air, the expected flow being a function of at least engine speed, and comparing the measured flow to the expected flow to derive a difference value. A leak is determined to exist in at least one of the plurality of bearing chamber seals when the difference value exceeds a predetermined variance value.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION OF THE DISCLOSURE

The present disclosure provides a system and method for the early and automatic detection of worn or damaged bearing chamber seals through the monitoring of the buffer system air flow. Before discussing the details of the improved leak detection system, the application environment will be briefly discussed in order to provide context for the reader. While the example application environment includes a turbofan gas turbine engine, it will be appreciated that this engine may be used in a land-based application such as at a generator station, or may be used in an air or other application, e.g., for propulsion of an aircraft. This disclosure also relates to the detection of failures in other air system components including but not limited to active clearance systems, buffer cooler systems, and other air systems both internal (tubes or passages) and external to the engine.

Figure 1:
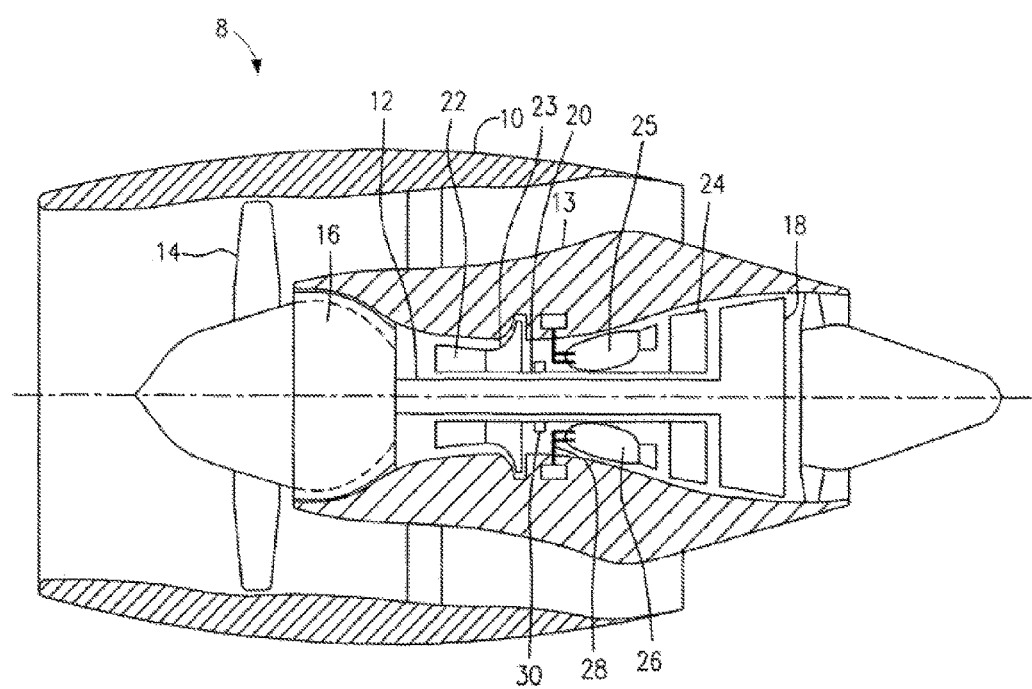
FIG. 1 is a simplified schematic cross-sectional view of a turbine engine within which embodiments of the disclosed principles may be implemented.

Referring now to FIG. 1, this figure shows a simplified schematic cross-section view of a turbofan gas turbine engine 8 within which various aspects of the disclosed principles may be applied. The illustrated engine 8 includes a nacelle 10, a core casing 13, a low pressure spool assembly 12, and a high pressure spool assembly 20. The low pressure spool assembly 12 includes a fan 14, low pressure compressor 16 and low pressure turbine 18, and the high pressure spool assembly 20 includes a high pressure compressor 22, an optional centrifugal compressor 23 and a high pressure turbine 24. A combustor 26 has a plurality of fuel injectors 28 through which fuel is introduced into the combustor 26 for creation of a high pressure hot gas effluent.

Each of the low and high pressure spool assemblies 12, 20 includes a shaft rotatably supported by a plurality of bearing assemblies 30. It should be appreciated that the described principles may also be applied to gas turbine engines and derivatives thereof wherein fan or intermediate shafts are used. Only a single bearing assembly 30 is shown for clarity, but it will be appreciated that any number of bearing assemblies 30 may be utilized as appropriate. As noted above, the engine 8 employs a bearing chamber pressurization system, not shown in this illustration, to buffer and supply pressurized air to seal the bearing assembly 30. Because of the necessary proximity of the bearing assemblies to other systems, moving parts, and potentially sensitive systems, and in order to maintain an appropriate lubricant level, the bearing assemblies are sealed as will be discussed in greater detail below.

Figure 2:
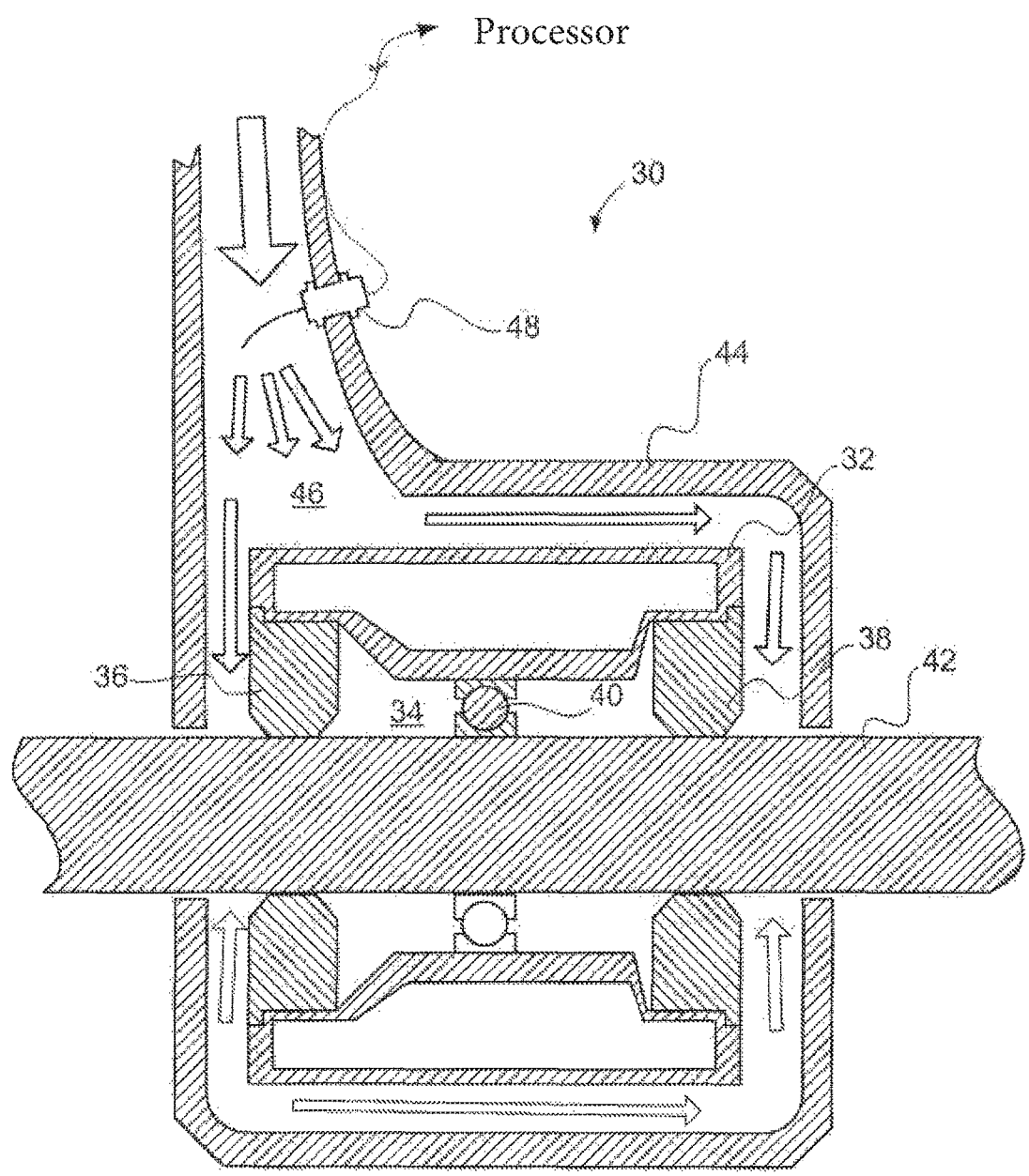
FIG. 2 is a simplified partial cross-sectional view of the gas turbine engine of FIG. 1 showing a bearing chamber and associated components and structures.

Turning now to FIG. 2, this figure is a simplified cross-sectional view of the bearing chamber and associated structures and components. The bearing assembly 30 includes an annular bearing housing 32 having a front side air-oil seal 36 and a rear air-oil side seal 38. A bearing chamber 34 is defined within the bearing housing 32 for accommodating bearings 40 which rotatably support the shaft 42, e.g., of the high pressure spool. The bearing housing 32 is supported within a stationary structure of the engine, and annular heat shields may be used to shield the bearing housing 32 depending upon conditions.

In an embodiment, the stationary structure 44 of the engine defines a plenum 46 surrounding the bearing assembly 30. In an alternative embodiment, the plenum 46 is instead comprised of local features (axial or radial annulus') that provide pressurized air to the air-oil seal arrangement. One or more walls of the plenum 46 may also comprise a rotating engine part such as a compressor blade. The plenum 46 contains pressurized air which impinges on the housing 32 through the front side seal 36 and the rear side seal 38 and may enter the bearing chamber 34.

The compressed air enters the plenum 46 itself via a bleed hole or other passageway from a high pressure area, such as a buffer chamber or compressor housing. The compressed air may be conducted to the plenum 46 via one or more radial leader passages spaced annularly about the bearing housing 32. At least one such passageway comprises a flow sensor 48 located and configured to sense flow data indicative of the total airflow into the plenum 46.

Normally, a small amount of air leaks across the buffer seal in the bearing chamber 34, wherein one or more lubricant conduits to and from an oil or oil/air mix source or sump vent the air. The delta pressure across the seals is the mechanism whereby oil is maintained within the bearing chamber 34. Thus, when one or more of the bearing chamber seals 36, 38 is damaged or worn to the point that it leaks an excessive amount of air, the delta pressure collapses and oil is no longer effectively maintained within the chamber 34. Symptomatically, a damaged seal 36, 38 will thus result in increased buffer air flow.

In an embodiment of the invention, the flow sensor 48 is a heated film flow sensor that senses flow rate. The sensed flow rate is indicative of flow volume in that the flow rate over a known area defines the flow volume. Though not shown, the flow sensor 48 is conductively linked to a processor via appropriate intermediate hardware such as amplifiers, isolators, D/A converters and so on. Although the flow sensor is a heated film sensor in an embodiment of the invention, other sensor types may be used as well. These include, without limitation, vane-type air flow meters, hot wire meters, differential pressure meters and so on, though it will be appreciated that sensors having no moving parts are preferred due to the sensitive environment.

Unless a dedicated constant-pressure air source is employed, the flow rate in the plenum 46 will vary as a function of engine operation, such that, for example, higher engine speeds may yield higher source pressures and accordingly higher flow rates. As such, the system, described in greater detail below, accommodates operating parameters to predict an expected airflow, rather than analyzing detected airflows against a static measure.

Figure 3:
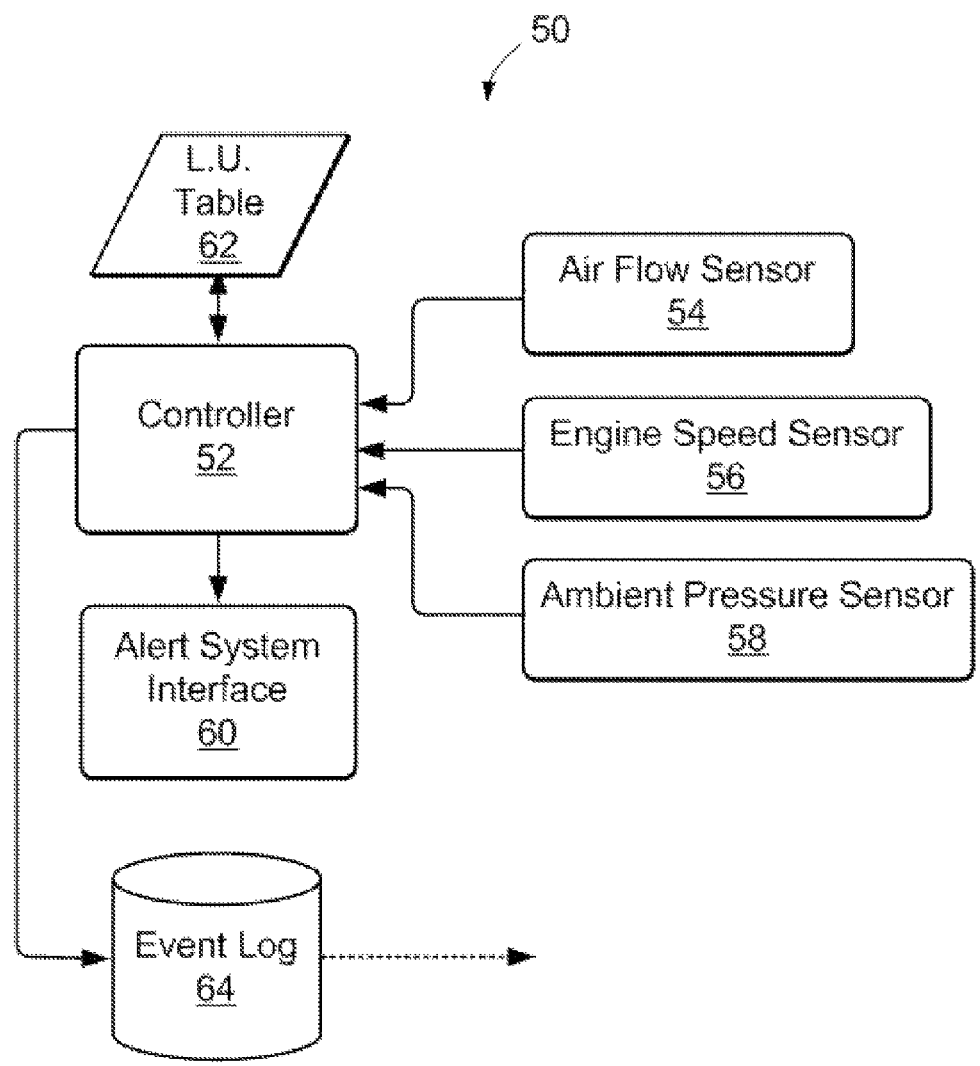
FIG. 3 is a schematic system illustration showing components and interrelationships employed for bearing chamber leak sensing in an embodiment of the invention.

Turning to FIG. 3, this figure provides a schematic system illustration showing components and interrelationships employed for bearing chamber leak sensing in an embodiment of the invention. The illustrated leak sensing system 50 is driven by an engine controller 52 and includes a bearing air flow sensor 54 in line with the buffer supply system to measure the buffer supply flow as described above. The system 50 further includes an engine speed sensor 56 and an ambient pressure sensor 58.

The ambient pressure sensor 58 senses the pressure at the location wherein the engine is in operation, to identify whether it is in a low pressure environment, such as at altitude, or in a high pressure environment, such as on a taxiway. It will be appreciated that the latter two sensors may be utilized by other engine or machine systems as well or alternatively may be dedicated sensors associated with the leak sensing system 50.

In order to alert the operator to any detected leak condition, the leak sensing system 50 includes an interface 60 to a user alert system, not shown. This is used in an embodiment of the invention to allow the engine controller 52 to provide a visual or audible warning to the human operator of the machine associated with the engine, e.g., an aircraft, when a substantial leak is detected.

During operation, the engine controller 52 periodically samples the various sensors including the bearing air flow sensor 54, engine speed sensor 56 and ambient pressure sensor 58. The engine controller 52 then predicts an expected flow rate based on these parameters, e.g., via a look-up table 62 or system of equations associating engine speed and ambient pressure with expected flow rate in the absence of seal leaks.

Once the expected flow rate is known, the engine controller 52 compares the measured actual flow rate from the bearing air flow sensor 54 with the calculated expected flow rate to determine if there is a substantial discrepancy. For example, the expected flow rate may have an expected variance of plus or minus 5%, and an actual flow that differs by more than that tolerance may be assumed to represent a problem in the engine. In particular, an excessive air flow may indicate a worn or damaged bearing chamber seal, while a deficient flow rate may represent a blockage or a sensor error.

If a discrepancy between the actual and expected air flows is detected, the engine controller 52 may set a fault code internally for later diagnostic retrieval and/or produce a warning to the operator to be conveyed via the interface 60. In an embodiment of the invention, the extent of the discrepancy is used to determine a class of warning to be provided to the user. For example, a measured flow rate that is barely outside of the variance around the expected flow rate may trigger an alert to have the engine serviced at the earliest opportunity, whereas a measured flow rate that is substantially outside the variance may trigger a warning to reduce or cease operation. Ideally other systems would also detect the condition of concern when it reaches such a magnitude, however, even in such cases the early detection system provides an additional safety factor.

In an embodiment of the invention, the system 50 includes an event log 64 linked to the controller 52. The event log 64 may be used by ground-based diagnostic and/or maintenance personnel to identify leak events that may not be currently triggering an alert. In addition, such personnel may review log records to determine the duration of a currently detected leak, so that for leaks of longer duration, additional maintenance or repair steps may be considered.

In addition to providing a degree of redundancy for existing leak detection methods, the benefits provided by the described early detection and alert system are numerous, primarily because the system allows otherwise undetectable leaks to be identified. Depending on engine configuration and operating conditions, even if the seal failure is not indirectly detectable by traditional means, it could still result in degradation of bearing compartment hardware by allowing hot air into the bearing compartment; if a failed seal in a critical location allows very hot air into a bearing compartment or allows oil to leak out, a fire may result.

Monitoring the flow of buffer air in this case could allow detection of an excessively worn seal prior to reaching such an advanced wear condition that it could lead to a fire. Moreover, the knowledge of which seal or set of seals are worn or failed has the additional benefit of allowing maintenance personnel to have appropriate parts on hand during overhaul, rather than discovering the seal condition upon tear down and only then obtaining the needed replacement parts. This will in turn help improve maintenance turn-around time.

Figure 4:
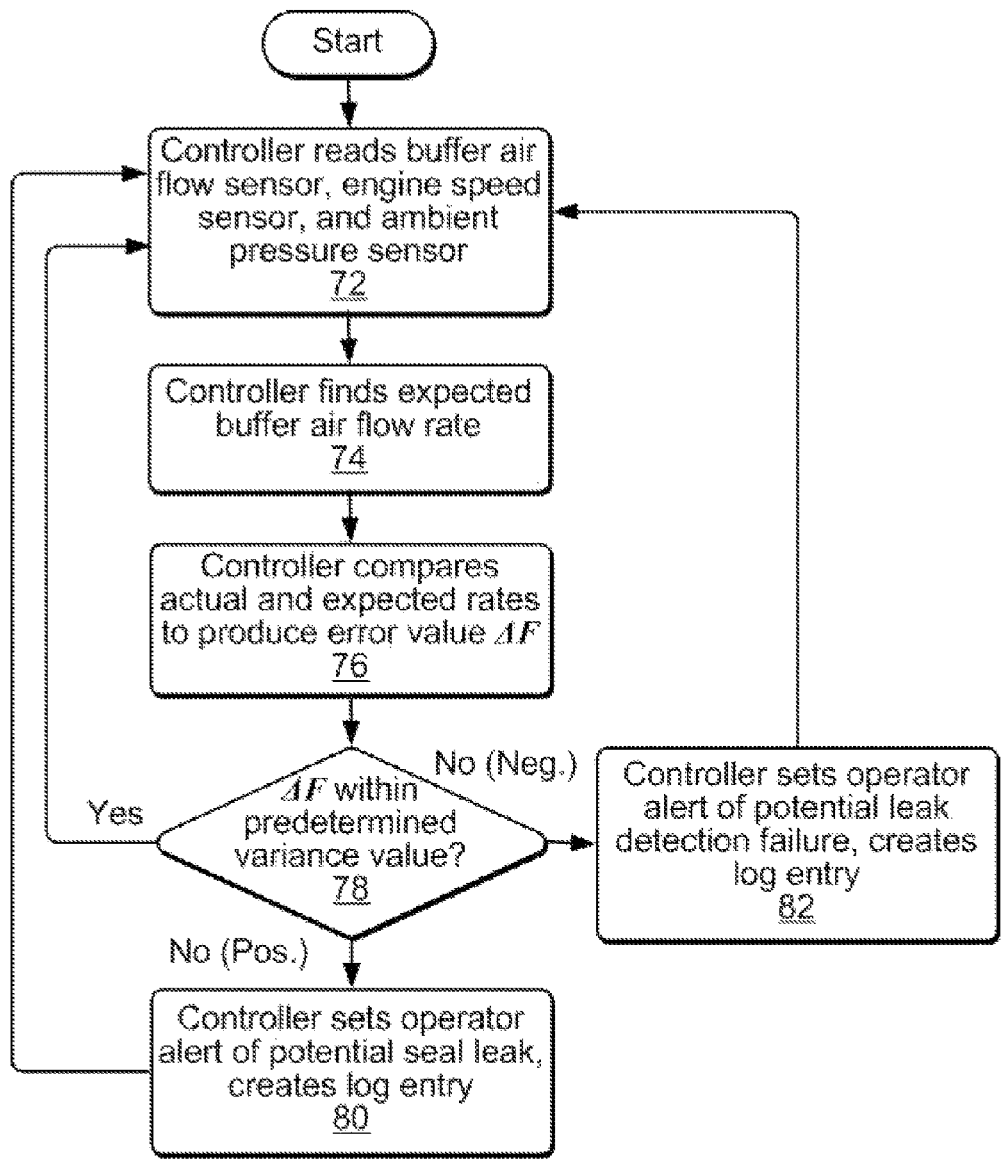
FIG. 4 is a flow chart of a process for detecting a bearing chamber seal leak in a gas turbine engine in accordance with an aspect of the disclosure.

Turning now to FIG. 4, this figure illustrates a flow chart of a process 70 for detecting a bearing chamber seal leak in a gas turbine engine. At stage 72 of the process 70, the engine controller 52 reads the buffer air flow sensor 54, the engine speed sensor 56, and the ambient pressure sensor 58. At this stage, the sensors may provide a direct reading or may provide an electrical signal that must be scaled or otherwise processed by the controller 52 to yield a usable value.

Based on the sensed engine speed and ambient pressure, the engine controller 52 predicts the expected buffer air flow rate at stage 74 by any suitable method, e.g., via a look-up table such as table 62 which associates an expected flow rate with each combination of engine speed and ambient pressure. Alternatively, the expected flow rate may be a calculated value rather than a retrieved value if the system is well-characterized. In any case, given the expected flow rate determined in stage 74, the engine controller 52 then compares the measured flow rate from the buffer air flow sensor 54 with the expected flow rate for current conditions at stage 76 and produces an error value $\Delta F$ reflecting the difference in flow rates.

In an embodiment of the invention, the magnitude and sign of $\Delta F$ are used by the controller 52 at stage 78 to determine the next action with respect to leak detection. Thus, if $\Delta F$ is within a predetermined variance value such as plus or minus 5% or other suitable value, the process 70 returns to stage 72 to await updated sensor data.

If instead it is determined that $\Delta F$ is positive and falls outside of the predetermined variance value, i.e., that the actual buffer air flow exceeds the expected airflow by more than the acceptable variance, then the process 70 flows to stage 80. The controller 52 at stage 80 sets an operator alert to notify the operator of a potential bearing seal leak, and optionally also creates a log entry of the time and date of the alert as well as the location of the potential leak. From stage 80, the process 70 returns to stage 72 to await further data.

In the event that the controller 52 determines at stage 78 that $\Delta F$ is negative and falls outside of the predetermined variance value, i.e., that the actual buffer air flow is less than the expected airflow by more than the acceptable variance, then the process 70 flows to stage 82, wherein the controller 52 sets an operator alert to notify the operator that the buffer air leak detection system may be malfunctioning. As with other error conditions, the controller optionally also creates a log entry of the time and date of the alert. From stage 82, the process 70 returns to stage 72 to await further data.

As noted above, in an embodiment of the invention, the extent of the discrepancy may be used to determine a class of warning to be provided to the user. Moreover, in a further embodiment, the duration of a sub-variance discrepancy across time and/or across varying operating conditions may be cause to trigger an operator alert as well. That is, for example, if the actual airflow exceeds the expected air flow by a sub-variance amount, but consistently does so for an extended period of time, an alert may be warranted.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A gas turbine having a bearing chamber leak detection system, the gas turbine comprising:
 a rotatable shaft;
 a bearing assembly supporting the rotatable shaft;
 a plurality of bearing chamber air-oil seals surrounding the bearing assembly creating an annular bearing chamber enclosing the bearing assembly;

one or more walls surrounding the annular bearing chamber creating a plenum that surrounds the annular bearing chamber between the one or more walls and the annular bearing chamber; and a pressurized air inlet to the plenum, the pressurized air inlet including an airflow sensor configured and positioned to sense a flow of pressurized air into the plenum, wherein the airflow at the airflow sensor is indicative of airflow from the plenum into the annular bearing chamber via one or more of the plurality of bearing chamber seals;

wherein sensed airflow that is greater than an expected flow is indicative of one or more of the plenum air-oil seals, through which the greater than expected flow is occurring, being damaged or worn.

2. The gas turbine in accordance with claim 1, wherein the airflow sensor configured and positioned to sense a flow of pressurized air into the plenum is one of a heated film sensor, a vane-type air flow meter, a hot wire meter, and a differential pressure meter.

3. The gas turbine in accordance with claim 1, further comprising a controller communicatively linked to the airflow sensor.

4. The gas turbine in accordance with claim 3, wherein the controller communicatively linked to the airflow sensor is configured to calculate an airflow value based on reading the airflow sensor and to detect a leak in one or more of the plurality of bearing chamber seals based on the airflow value.

5. The gas turbine in accordance with claim 4, wherein the controller is configured to detect a leak in one or more of the plurality of bearing chamber seals based on the airflow value by comparing the airflow value to an expected airflow value to produce a difference value and determining that a leak is present in one or more of the plurality of bearing chamber seals when the difference value exceeds a predetermined variance magnitude.

6. The gas turbine in accordance with claim 4, wherein the expected airflow value is dependent upon one or more engine operating parameters.

7. The gas turbine in accordance with claim 6, wherein the one or more engine operating parameters include engine speed, ambient pressure and compressor pressure.

8. The gas turbine in accordance with claim 4, wherein the controller includes a user interface output for providing an alert to an operator when it is determined that a leak is present in one or more of the plurality of bearing chamber seals.

9. The gas turbine in accordance with claim 4, wherein the controller further includes an output interface to a memory device for logging leak event data.

10. The gas turbine in accordance with claim 1, wherein the flow of pressurized air into the plenum is provided from a buffer chamber.

11. The gas turbine in accordance with claim 1, wherein the flow of pressurized air into the plenum is provided via one or more bleed holes from a compressor stage of the engine.

12. A method of detecting a leak in one or more bearing chamber seals protecting a bearing assembly within a bearing chamber in a gas turbine engine, the method comprising:

providing a flow of pressurized air through a pressurized air inlet into a plenum that surrounds the bearing chamber and bearing chamber seals, wherein the flow of pressurized air is provided against the one or more bearing chamber air-oil seals from outside of the bearing chamber;

positioning an airflow sensor in the pressurized air inlet;

measuring a flow of the pressurized air into the bearing chamber using the airflow sensor; and determining that a leak in at least one of the bearing chamber seals in the plenum is present if the measured flow of pressurized air exceeds an expected flow of pressurized air;

wherein sensed airflow that is greater than an expected flow is indicative of one or more of the plenum air-oil seals, through which the leak is occurring, being damaged or worn.

13. The method of detecting a leak in accordance with claim 12, wherein providing a flow of pressurized air against the one or more bearing chamber seals from outside of the bearing chamber comprises introducing pressurized air into the plenum formed of one or more walls that are surrounding the bearing chamber.

14. The method of detecting a leak in accordance with claim 13, wherein introducing pressurized air into the plenum surrounding the bearing chamber comprises directing air from one or more bleed holes in a compression stage of the engine to the plenum.

15. The method of detecting a leak in accordance with claim 12, wherein measuring a flow of the pressurized air into the bearing chamber comprises measuring a flow of the pressurized air through the plenum.

16. The method of detecting a leak in accordance with claim 12, wherein determining that a leak in at least one of the bearing chamber seals is present if the measured flow of pressurized air exceeds an expected flow of pressurized air comprises deriving the expected flow of pressurized air based at least on engine speed.

17. The method of detecting a leak in accordance with claim 12, wherein the measured flow of pressurized air is determined to exceed the expected flow of pressurized air if the measured flow is greater than the expected flow by more than a predetermined variance.

18. The method of detecting a leak in accordance with claim 12, wherein determining that a leak in at least one of the bearing chamber seals is present further comprises determining that there is a defect in an air system circuit and/or air system component.

19. The method of detecting a leak in accordance with claim 18, wherein the defect in an air system circuit and/or air system component includes a defect in one of an active clearance system, a buffer cooler system, and another air system.

20. A controller for detecting a bearing seal leak in a gas turbine engine having a bearing assembly within a bearing chamber bordered by a plurality of bearing chamber air-oil seals, wherein the plurality of bearing chamber seals are pressurized from outside of the bearing chamber via pressurized air through a pressurized air inlet in a plenum that surrounds the bearing chamber and bearing chamber seals, the controller being configured to execute steps including:

positioning an airflow sensor in the pressurized air inlet;

measuring a flow of pressurized air into the bearing chamber via at least one of the plurality of bearing chamber seals using the airflow sensor;

providing an expected flow of pressurized air, the expected flow being a function of at least engine speed;

comparing the measured flow to the expected flow to derive a difference value; and determining that a leak in at least one of the plurality of bearing chamber seals in the plenum is present when the difference value exceeds a predetermined variance value;

wherein sensed airflow that exceeds a predetermined variance value is indicative of one or more of the plenum air-oil seals, through which the leak is occurring, is damaged or worn.

\* \* \* \* \*